(12) United States Patent
Burkholder et al.

(10) Patent No.: US 10,076,133 B2
(45) Date of Patent: Sep. 18, 2018

(54) FREEZE-DRIED AERATED FRUIT AND/OR VEGETABLE COMPOSITIONS AND METHODS OF MAKING THEREOF

(71) Applicant: Nestec S. A., Vevey (CH)

(72) Inventors: Thomas Burkholder, East Amherst, NY (US); Scott Peterson, Spring Lake, MI (US); Frank Welch, Kentwood, MI (US)

(73) Assignee: Nestec S. A., Vevey (CH)

( * ) Notice: Subject to any disclaimer, the term of this patent is extended or adjusted under 35 U.S.C. 154(b) by 463 days.

(21) Appl. No.: 15/052,111

(22) Filed: Feb. 24, 2016

(65) Prior Publication Data

US 2016/0183571 A1 Jun. 30, 2016

Related U.S. Application Data

(60) Continuation of application No. 13/633,378, filed on Oct. 2, 2012, now abandoned, which is a division of application No. 12/650,820, filed on Dec. 31, 2009, now abandoned, which is a continuation-in-part of application No. 12/599,328, filed as application No. PCT/US2008/063306 on May 9, 2008, now Pat. No. 9,968,124.

(60) Provisional application No. 60/916,956, filed on May 9, 2007.

(51) Int. Cl.
| | | |
|---|---|---|
| *A23L 5/10* | (2016.01) | |
| *A23B 7/024* | (2006.01) | |
| *A23P 30/40* | (2016.01) | |
| *G06Q 99/00* | (2006.01) | |
| *A23L 29/10* | (2016.01) | |
| *A23L 29/20* | (2016.01) | |
| *A23L 19/00* | (2016.01) | |

(52) U.S. Cl.
CPC .............. *A23P 30/40* (2016.08); *A23B 7/024* (2013.01); *A23L 19/09* (2016.08); *A23L 29/10* (2016.08); *A23L 29/20* (2016.08); *G06Q 99/00* (2013.01); *A23V 2002/00* (2013.01)

(58) Field of Classification Search
CPC ...... A23L 1/2128; A23L 1/035; A23L 1/0097; A23L 19/09; A23L 29/10; A23L 29/20; A23B 7/024; A23P 30/40
See application file for complete search history.

(56) References Cited

U.S. PATENT DOCUMENTS

| | | | |
|---|---|---|---|
| 2,955,943 A | 10/1960 | Morgan et al. | |
| 3,313,032 A | 4/1967 | Malecki | |
| 3,492,126 A * | 1/1970 | Rubenstein | A23F 3/163 426/329 |
| 3,656,971 A | 4/1972 | Reimer | |
| 4,055,675 A | 10/1977 | Popper et al. | |
| 4,080,477 A | 3/1978 | Tsumara et al. | |
| 4,244,981 A | 1/1981 | Blake | |
| 4,368,211 A | 1/1983 | Blake et al. | |
| 4,386,211 A | 5/1983 | Henderson et al. | |
| 4,515,822 A | 5/1985 | Kraig et al. | |
| 4,542,035 A | 9/1985 | Huant et al. | |
| 4,624,853 A | 11/1986 | Rudin | |
| 4,631,196 A | 12/1986 | Zeller | |
| 4,702,923 A | 10/1987 | Sennosuke et al. | |
| 4,855,155 A | 8/1989 | Cavallin | |
| 4,889,730 A | 12/1989 | Roberts et al. | |
| 4,891,235 A | 1/1990 | Mizuguchi et al. | |
| 4,946,697 A | 8/1990 | Payne | |
| 4,948,609 A | 8/1990 | Nafisi-Movaghar | |
| 4,956,185 A | 9/1990 | Cajigas | |
| 5,000,974 A | 3/1991 | Albersmann | |
| 5,093,137 A | 3/1992 | Shazer, Jr. et al. | |
| 5,143,096 A | 9/1992 | Steinberg | |
| 5,147,668 A | 9/1992 | Munk | |
| 5,176,928 A | 1/1993 | Shazer et al. | |
| 5,665,413 A | 9/1997 | Rossiter | |
| 6,183,803 B1 | 2/2001 | Morcol et al. | |
| 6,361,813 B1 | 3/2002 | Kitaoka et al. | |
| 6,713,100 B1 | 3/2004 | Schmoutz et al. | |
| 6,841,181 B2 | 1/2005 | Jager et al. | |
| 7,005,175 B2 | 2/2006 | Hachenberg et al. | |
| 7,118,772 B2 | 10/2006 | Froseth et al. | |
| 7,264,835 B2 | 9/2007 | Funk | |
| 2002/0192345 A1 | 12/2002 | Kepplinger et al. | |
| 2003/0113436 A1 | 6/2003 | Fukinbara | |
| 2003/0194468 A1 | 10/2003 | Klonkoly | |
| 2004/0109933 A1 | 6/2004 | Roy et al. | |
| 2004/0110442 A1 | 6/2004 | Rhim et al. | |
| 2004/0161522 A1 | 8/2004 | Toves | |
| 2006/0013925 A1 | 1/2006 | Bauman et al. | |

(Continued)

FOREIGN PATENT DOCUMENTS

| | | |
|---|---|---|
| CA | 994158 | 8/1976 |
| CA | 2183168 | 9/1995 |

(Continued)

OTHER PUBLICATIONS

Tsen, J.-H., King, V.A.-E. 2002. "Density of banana puree as a function of soluble solids concentration and temperature." J. Food Eng. vol. 55. pp. 305-308.*

Functional Foods Fact Sheet: Probiotics and Prebiotics Oct. 15, 2009. Downloaded from http://www.foodinsight.org/Resources/Detail.aspx?topic=Functional_Foods_Sheet_Probiotics_and_Prebioics on Aug. 16, 2012.

Gerber Graduates. MiniFruits & MiniVeggies. 2005. http://web.archive.org/web/20051026002915/http://gerber.com/toddlersite?tmsdir=food&tmspage=grad_mini.html&tmspromo=2 Downloaded Dec. 8, 2011.

Gerber. Graduates Yogurt Melts—Strawberry. Dec. 18, 2010, pp. 2 http://web.archive.org/web/20101218155236/http://www.gerber.com/AllStages/products/snacks/yogurt_melts_strawberry.aspx.

(Continued)

*Primary Examiner* — Nikki H. Dees
(74) *Attorney, Agent, or Firm* — Dunlap Codding, P.C

(57) ABSTRACT

A freeze-dried, aerated fruit and/or vegetable composition that includes fruit and/or vegetable ingredient(s) and an emulsifier are disclosed, as well as methods of making thereof.

16 Claims, No Drawings

(56) References Cited

U.S. PATENT DOCUMENTS

| | | |
|---|---|---|
| 2006/0286209 A1 | 12/2006 | Sweley et al. |
| 2006/0286270 A1 | 12/2006 | Jordan |
| 2007/0071866 A1 | 3/2007 | Cox |
| 2009/0324773 A1 | 12/2009 | Peterson |
| 2011/0183041 A1 | 7/2011 | Barniol et al. |

FOREIGN PATENT DOCUMENTS

| | | | | |
|---|---|---|---|---|
| CA | 2546423 | | 7/2005 | |
| DE | 1149975 | | 6/1963 | |
| EP | 0118048 | | 9/1984 | |
| EP | 0331281 | | 9/1989 | |
| EP | 0461718 | | 12/1991 | |
| EP | 0649599 | | 4/1995 | |
| EP | 0897670 | | 2/1999 | |
| EP | 1048216 | | 11/2000 | |
| EP | 1430785 | | 6/2004 | |
| ES | 2001820 | | 6/1988 | |
| FR | 2019776 | | 7/1970 | |
| GB | 1070060 A | * | 5/1967 | ............. A23B 7/024 |
| GB | 1129804 | | 10/1968 | |
| GB | 1343640 | | 1/1974 | |
| GB | 1484167 | | 9/1977 | |
| HU | 195094 | | 4/1988 | |
| JP | 55159752 | | 12/1980 | |
| JP | 62083842 | | 4/1987 | |
| JP | 63-14658 | | 1/1988 | |
| JP | 02286039 | | 11/1990 | |
| JP | 7079696 | | 3/1995 | |
| JP | 9313101 | | 12/1997 | |
| JP | 2000210042 | | 8/2000 | |
| JP | 200145968 | | 2/2001 | |
| JP | 200234462 | | 2/2002 | |
| JP | 2004222673 | | 8/2004 | |
| JP | 2004236612 A | | 8/2004 | |
| JP | 2005053049 | | 3/2005 | |
| JP | 2005530499 | | 10/2005 | |
| JP | 2009148254 | | 7/2009 | |
| JP | 2011032673 | | 2/2011 | |
| RU | 1837787 | | 8/1993 | |
| SU | 800538 | | 1/1981 | |
| WO | 8912407 | | 12/1989 | |
| WO | 9505085 | | 2/1995 | |
| WO | 9900021 | | 1/1999 | |
| WO | 20060950 | | 10/2000 | |
| WO | 0065935 | | 11/2000 | |
| WO | 2001006865 | | 2/2001 | |
| WO | 2001019203 | | 3/2001 | |
| WO | 0162099 | | 8/2001 | |
| WO | 03028471 | | 4/2003 | |
| WO | 03086092 | | 10/2003 | |
| WO | 03096816 | | 11/2003 | |
| WO | 2004040991 | | 5/2004 | |
| WO | 2005096833 | | 10/2005 | |
| WO | 2006017363 | | 2/2006 | |
| WO | 2008141229 | | 11/2008 | |
| WO | 2008141233 | | 11/2008 | |

OTHER PUBLICATIONS

Harmon, Emily. Gerber Graduates Yogurt Melts: Natural Snacking for Toddlers. Jun. 2, 2008, pp. 3 http://voices.yahoo.com/gerber-graduates-yogurt-melts-natural-snacking-for-1526861.html?cat=25.

McGee. 2004. On Food and Cooking. Scribner. pp. 20,21,632,633.

Nestle Baby. Gerber Graduates Yogurt Melts. 2007. http://web.nestlebaby.com/sg/baby_nutrition/Products/product_detail.htm?stage=0&id=2950 p. 1.

Garcia, et al., "Lowfat Ice Creams from Freeze-Concentrated Versus Heat-Concentrated Nonfat Milk Solids,"1995, J. Diary Sci, 78:2345-2351.

Hartel, et al., "Freeze Concentration of Skim Milk," Journal of Food Engineering 20 (1993), 101-120.

Kumeno, et al., "Production and Characterization of a Pressure-induced Gel from Freeze-concentrated Milk," Biosci. Biotech. Biochem., 57 (5), 750-752, 1993.

Mohamed, et al., "Hard Cheese Making From Camel Milk," Milchwissenschaft 45 (11) 1990, 716-719.

International Search Report for International Application No. PCT/US2008/053582 dated Jun. 26, 2008.

U.S. Appl. No. 13/475,411, Scott Peterson, Office Action dated Mar. 23, 2015.

Kuntz, L.A., "Special Effects With Gums"; Food Product Design, retrieved from http://www.foodproductdesign.com/articles/1999/12/special-effects-with-gums.aspx# on Mar. 11, 2015.

U.S. Appl. No. 12/599,328, Scott Peterson, Office Action dated Mar. 23, 2015.

Beech-Nut Corn and Sweet Potato; (2006); Downloaded from https://web.archive.org/web20060313015338/http://www.beech-nut.com; on Mar. 11, 2015.

Beech-Nut Carrot, Apple & Mango; (2006); Downloaded from https://web.archive.org/web/20060313015338/http://www.beech-nut.com on Mar. 11, 2015.

* cited by examiner

FREEZE-DRIED AERATED FRUIT AND/OR VEGETABLE COMPOSITIONS AND METHODS OF MAKING THEREOF

CROSS REFERENCE TO RELATED APPLICATIONS/INCORPORATION BY REFERENCE STATEMENT

This application is a continuation of U.S. Ser. No. 13/633,378, filed Oct. 2, 2012, now abandoned; which is a divisional of U.S. Ser. No. 12/650,820, filed Dec. 31, 2009, now abandoned; which is a continuation-in-part of U.S. Ser. No. 12/599,328, filed on Nov. 9, 2009; which is a U.S. national stage application filed under 35 USC § 371 of International Application No. PCT/US08/63306, filed on May 9, 2008; which claims priority to U.S. Ser. No. 60/916,956, filed on May 9, 2007. The entire contents of each of the above applications are hereby expressly incorporated herein by reference.

BACKGROUND

Aerated compositions are known in the art. Aeration can provide desirable characteristics such as light, fluffy textures. It is also known in the art that aerated products are subject to physical and chemical instability and therefore can destabilize over time. One solution to such instability issues in aerated milk-based products includes the addition of a hydrated emulsifier to already cultured dairy products before aeration (See e.g. U.S. Pat. No. 7,005,157, hereinafter "the '157 patent"). Specifically, the '157 patent teaches against adding ingredients directly to the milk blend prior to fermentation because such ingredients can adversely affect processing considerations such as fermentation times. The '157 patent teaches that the addition of a hydrated emulsifier post-fermentation avoids adversely lengthening fermentation times while contributing to stability. Freeze-drying is a process well known in the food industry. It is critical in further drying aerated products that the resulting product retain sensory attributes that are important to consumers. Using the invention taught in the '157 patent, hydration of the aerated product before freeze-drying can detrimentally affect physical stability. For example, a hydrated, aerated product when freeze-dried may result in increased fragility during shipping and handling of the product. Fruit purees are difficult to freeze-dry because of their sugar content. The fruit purees hold onto water, so it is difficult to decouple the sugar and water.

As a further example, dissolvability is an important issue in a freeze-dried product. Specifically, the aerated product, which has been dried and treated with air, must still remain readily dissolvable upon consumption at such a rate as to transfer flavor to the consumer's taste buds. Moreover, the product should be readily dissolvable to reduce the risk of choking hazards for consumers with restricted or under-developed oral motor skills or digestive functions. As a known solution, increasing the aeration can improve dissolvability. However, increased aeration has the negative effect of reducing the hardness of the end product. When the hardness is reduced, the physical stability of product can be compromised.

Therefore, there is a need for a product that is freeze-dried and aerated that has improved physical stability and improved dissolvability.

DETAILED DESCRIPTION

As used throughout, ranges are used as a shorthand for describing each and every value that is within the range. Any value within the range can be selected as the terminus of the range. When used, the phrase "at least one of" refers to the selection of any one member individually or any combination of the members. The conjunction "and" or "or" can be used in the list of members, but the "at least one of" phrase is the controlling language. For example, at least one of A, B, and C is shorthand for A alone, B alone, C alone, A and B, B and C, A and C, or A and B and C.

"Freeze-dry" is a dehydration process that works by freezing the material and then reducing the surrounding pressure to allow the frozen water in the material to sublimate directly from the solid phase to gas.

"Aeration" is the process of introducing air to increase gas concentration in liquids. Aeration may be performed by bubbling a gas through the liquid, spraying the liquid into the gas or agitation of the liquid to increase surface absorption.

"Dissolvability" is defined as the change in hardness of a product in going from a dry to a wet state.

"Hardness" is defined as the peak stress prior to fracturing a material. Universal Tester model 4465 with 100 N static load cell, manufactured by Instron in Canton, Mass., is used. The probe used for testing is a compression anvil #2830-011. Initial settings for speed of probe were 1 mm/second to approximately 90% compression. Speed based upon journal article in J. Texture Studies, 36 (2005), pp 157-173, "Effects of Sample Thickness of Bite Force for Raw Carrots and Fish Gels." Testing is repeated on 10-15 replicate samples for each variable.

"Viscosity" is defined as a measure of the resistance of a substance to flow. Viscosity is measured using a Brookfield viscometer with a Helipath® stand with an F-T bar before the composition is aerated. Viscosity aids in holding the shape of a substance through aeration and deposit.

The presently disclosed and/or claimed inventive concept(s) comprises a fruit and/or vegetable composition useful in the preparation of a freeze-dried, aerated product. The first component of the composition comprises a fruit and/or vegetable ingredient. The fruit and/or vegetable ingredient is selected from any ordinarily known in the art. In certain non-limiting embodiments, the fruit and/or vegetable ingredient is pureed. The fruit and/or vegetable ingredient is present in amount of from 60% to 98%, such as (but not limited to) from 70% to 90% or from 60% to 80% of the composition.

The presently disclosed and/or claimed inventive concept(s) comprises a fruit and/or vegetable composition useful in the preparation of a freeze-dried, aerated product. The first component of the composition comprises a fruit and/or vegetable ingredient. The fruit and/or vegetable ingredient is selected from any ordinarily known in the art. In certain non-limiting embodiments, the fruit and/or vegetable ingredient is pureed. The fruit and/or vegetable ingredient is present in an amount from 60% to 98%, such as (but not limited to) from 70% to 90% or from 60% to 80% of the composition.

The second component of the present composition comprises an emulsifier. While not wishing to be bound by any theories, it is believed that the emulsifier reduces the surface tension at the air-liquid interface, therefore allowing for stable dispersion of air bubbles within the viscous liquid matrix. In certain non-limiting embodiments, the emulsifier is a lactylated mono and diglyceride. The lactylated mono and diglyceride is selected from the group consisting of but not limited to lactic and citric acid esters of mono- and diglycerides, distilled monoglycerides, and combinations thereof. While not wishing to be bound by any theories, it is believed that the lactic acid stays in the water phase and the monoglycerides stay in the hydrophobic phase for whipping agent. The lactylated mono and diglycerides are present in an amount of from 0.001 to 1%, such as (but not limited to) from 0.01 to 0.5% or from 0.1 to 0.4% of the composition. It is believed that the lactylated mono and diglyceride component of the presently disclosed and/or claimed inventive concept(s) promotes stabilization of the final aerated composition.

The composition of the presently disclosed and/or claimed inventive concept(s) can further comprise optional ingredients such as starch, gums, whipping aids, sugars and stabilizers. Starches include but are not limited to tapioca, corn and rice. The rice can be native, physically or chemically modified. Gums include but are not limited to pectin, gelatin, carrageenan, locust bean gum, guar gum, cellulose gums, microcrystalline cellulose. Whipping aids include but are not limited to lactic acid esters of mono/diglycerides, as well as other acid esters, and other emulsifiers with foam stabilization ability (polysorbate 80), egg white and whey protein.

Hardness, Dissolvability and Viscosity

The consumer preference for the final product of the presently disclosed and/or claimed inventive concept(s) is believed to be based on physical characteristics such as hardness, viscosity and dissolvability. While each characteristic is important, the correct balance between the three components is desired to optimize the end product of the presently disclosed and/or claimed inventive concept(s). Viscosity is defined as a measure of the resistance of a substance to flow. Viscosity is measured using a Brookfield viscometer with a Helipath® stand with an F-T bar before the composition is aerated. It is believed that while the viscosity aids in holding the shape of a substance through aeration and deposit, the hardness aids in physical stability. The dissolvability, also a hardness measurement, is the change in hardness of a product in going from a dry to a wet state. With increased aeration, which aids in dissolvability, the hardness can be negatively affected. The compositions and methods of the presently disclosed and/or claimed inventive concept(s) have unexpectedly discovered the optimum balance between viscosity, hardness and dissolvability to provide a physically stable and consumer acceptable product.

The composition of the presently disclosed and/or claimed inventive concept(s) has a hardness value of from 0.5 to 8 pounds force, such as (but not limited to) from 1.5 to 5.5 pounds force.

The composition of the presently disclosed and/or claimed inventive concept(s) has a dissolvability in the range of from 0.1 to 8 peak load.

The composition of the presently disclosed and/or claimed inventive concept(s) has a viscosity of from 1,000 to 100,000 cp, dependent upon the temperature and speed of the viscometer used to measure the viscosity. In certain non-limiting embodiments, the viscosity of the wet composition ranges from 30,000 to 60,000 cp at a 10 RPM speed of the spindle 6 in a Brookfield Viscometer. In a particular, non-limiting embodiment, the range is from 35,000 to 50,000 cp.

The presently disclosed and/or claimed inventive concept(s) further provides a method of marketing such compositions to children to promote child development, increase child development through providing developmentally appropriate size, shape and dissolution characteristics. Further, the presently disclosed and/or claimed inventive concept(s) provides a method of providing probiotics to a child through the compositions disclosed herein. It should be understood that the main ingredient in the compositions can be from the group comprising fruit, vegetables, grains, proteins, dairy, dairy substitutes and any combinations thereof.

Method of Making

A method of preparing a freeze-dried, aerated fruit and/or vegetable product comprising the steps of (a) providing a fruit and/or vegetable blend; (b) adding an emulsifier; (c) thermally processing the fruit and/or vegetable blend; (d) fermenting the blend; (e) admixing a gas with the blend; (f) simultaneously aerating the gas and the fruit and/or vegetable blend to form an aerated product; (f) cooling the product; and (g) freeze-drying the product. Step (f) is included as an optional step.

A method of preparing a freeze-dried, aerated fruit and/or vegetable product comprising the steps of (a) providing a fruit and/or vegetable blend; (b) adding an emulsifier; (c) thermally processing the fruit and/or vegetable blend; (d) fermenting the blend; (e) admixing a gas with the blend; (f) simultaneously aerating the gas and the fruit and/or vegetable blend to form an aerated product; (f) cooling the product; and (g) freeze-drying the product. Step (f) is included as an optional step.

Example 1

Puree Melts—Apple Strawberry

| STEP 1-Puree Melts Blending | | | |
|---|---|---|---|
| Component | SA Number | Supplier | % of formula |
| Apple Puree, (12.5 brix) | IP04354 | Gerber | 55 |
| White Grape Juice Concentrate, (68 brix) | SA00298 | San Joaquin Valley Conc. | 7.5 |
| Strawberry Puree, Seedless, Organic | SA04786 | Cal Pacific | 12 |
| Tapioca Starch | Novation 3300 | National Starch | 1 |
| Pectin, High Methoxy | SA00458 | CP Kelco | 0.75 |
| Lactic Acid Esters of Mono/Diglycerides | SA70271 | Danisco | 0.4 |
| Citric Acid | SA00176 | Tate and Lyle | 0.1 |
| Ascorbic Acid | SA00886 | Weisheng | 0.1 |
| Water | SA0000 | | 18.65 |
| TOTAL | | | 95.5 |

Procedure:

1. Preblend starch, Pectin and LACTEM with water using high shear blender (such as bredo).

2. Add ascorbic acid and citric acid to mixture.

3. Slow blender speed to low and add white grape juice concentrate.

4. Finally, add apple puree and strawberry puree and blend on low speed 1 min.

5. Run puree blend through plate pastuerizer preheater, then homogenize 2500/500 psi (2-stage).

6. Thermally process puree mix at 190 deg F. for 2-8 minutes.

7. Cool to 41 deg. F.

8. Mixture can be deposited unaerated or aerated.

9. To Aerate, pump through Mondomix Aerator and admix nitrogen gas to target of 30-60% overrun.

10. Deposit as drops, 0.8-1.2 grams weight, onto solid steel freezer belt and freeze.

11. Freeze dry frozen drops.

The composition described above is made using the methods described herein.

It should be appreciated that the presently disclosed and/or claimed inventive concept(s) is not limited to the specific embodiments described above, but includes variations, modifications and equivalent embodiments defined by the following claims.

What is claimed is:

1. A method of providing a shelf stable fruit and/or vegetable product comprising the steps of:
adding an emulsifier to at least one ingredient and mixing the emulsifier and the at least one ingredient to form an emulsifier-containing blend, wherein the at least one ingredient is selected from the group consisting of a fruit, a vegetable, and combinations thereof, and wherein the emulsifier is selected from the group consisting of lactic acid esters of monoglycerides, lactic acid esters of diglycerides, citric acid esters of monoglycerides, citric acid esters of diglycerides, distilled monoglycerides, and combinations thereof;
thermally processing the emulsifier-containing blend by heating the blend;
admixing a gas with the heated, emulsifier-containing blend and aerating same to form an aerated product;
forming the aerated product into a plurality of drops having a weight in a range of from 0.8 to 1.2 grams; and
freeze drying the plurality of drops to form the shelf stable fruit and/or vegetable product, wherein the product is designed to be readily dissolvable upon consumption so as to increase child development by having a developmentally appropriate size, shape, and dissolution characteristics, and wherein the product is designed to reduce the risk of choking hazards for children with restricted or underdeveloped oral motor skills or digestive functions, whereby the product has a hardness value of from 0.5 to 8 pounds force peak load, a dissolvability in the range of from 0.1 to 8 pounds force peak load, and a viscosity of from 1000 to 100,000 cp as measured at a 10 rpm speed of the spindle 6 in a Brookfield viscometer before the product is aerated, and wherein the at least one fruit and/or vegetable ingredient is present in an amount from 60% to 80% by weight of the product prior to freeze-drying.

2. The method of claim 1, wherein at least one additional ingredient is added along with the emulsifier to the at least one fruit and/or vegetable ingredient, and wherein the at least one additional ingredient is selected from the group consisting of:
(a) a starch from a source selected from the group consisting of tapioca, rice, corn, and combinations thereof;
(b) a gum selected from the group consisting of pectin, gelatin, carrageenan, cellulose gum, microcrystalline cellulose, and combinations thereof;
(c) a sugar; and
(d) any combination of (a)-(c).

3. The method of claim 1, wherein the product further comprises a probiotic.

4. The method of claim 1, wherein the viscosity of the product is from 30,000 to 60,000 cp when wet.

5. The method of claim 1, wherein the at least one fruit and/or vegetable ingredient comprises at least two fruits.

6. The method of claim 1, wherein the at least one fruit and/or vegetable ingredient comprises at least two vegetables.

7. The method of claim 1, wherein the at least one fruit and/or vegetable ingredient comprises at least one fruit and at least one vegetable.

8. The method of claim 1, wherein the emulsifier is present in an amount of from 0.001% to 1% by weight of the product prior to freeze-drying.

9. The method of claim 8, wherein the emulsifier is present in an amount of from 0.1% to 0.4% by weight of the product prior to freeze-drying.

10. The method of claim 1, further comprising the step of cooling the product prior to freeze-drying.

11. The method of claim 1, wherein the emulsifier consists of lactic acid esters of mono- and diglycerides (LACTEM).

12. A method of providing a shelf stable fruit and/or vegetable product comprising the steps of:
adding an emulsifier to at least one ingredient and mixing the emulsifier and the at least one ingredient to form an emulsifier-containing blend, wherein the at least one ingredient is selected from the group consisting of a fruit, a vegetable, and combinations thereof, and wherein the emulsifier comprises lactic acid esters of mono- and di-glycerides;
thermally processing the emulsifier-containing blend by heating the blend;
admixing a gas with the heated, emulsifier-containing blend and aerating same to form an aerated product;
forming the aerated product into a plurality of drops having a weight in a range of from 0.8 to 1.2 grams; and
freeze drying the plurality of drops to form the shelf stable fruit and/or vegetable product, wherein the product is designed to be readily dissolvable upon consumption so as to increase child development by having a developmentally appropriate size, shape, and dissolution characteristics, and wherein the product is designed to reduce the risk of choking hazards for children with restricted or underdeveloped oral motor skills or digestive functions, whereby the product has a hardness value of from 0.5 to 8 pounds force peak load, a dissolvability in the range of from 0.1 to 8 pounds force peak load, and a viscosity of from 1000 to 100,000 cp as measured at a 10 rpm speed of the spindle 6 in a Brookfield viscometer before the product is aerated, and wherein the at least one fruit and/or vegetable ingredient is present in an amount from 60% to 80% by weight of the product prior to freeze-drying and the emulsifier is present in an amount of from 0.001% to 1% by weight of the product prior to freeze-drying.

13. The method of claim 12, wherein at least one additional ingredient is added along with the emulsifier to the at least one fruit and/or vegetable ingredient, and wherein the at least one additional ingredient is selected from the group consisting of:
(a) a starch from a source selected from the group consisting of tapioca, rice, corn, and combinations thereof;
(b) a gum selected from the group consisting of pectin, gelatin, carrageenan, cellulose gum, microcrystalline cellulose, and combinations thereof;
(c) a sugar; and
(d) any combination of (a)-(c).

14. The method of claim 12, wherein the emulsifier is present in an amount of from 0.1% to 0.4% by weight of the product prior to freeze-drying.

15. The method of claim 12, further comprising at least one additional step of:
(a) cooling the product prior to freeze-drying; and/or
(b) fermenting the emulsifier-containing blend after the thermal processing step.

16. A method of providing a shelf stable fruit and/or vegetable product comprising the steps of:

mixing together an emulsifier, at least two of a fruit, a vegetable, and combinations thereof, and at least one additional ingredient to form an emulsifier-containing blend, wherein the emulsifier comprises lactic acid esters of mono- and di-glycerides, and wherein the at least one additional ingredient is selected from the group consisting of:
  (a) a starch from a source selected from the group consisting of tapioca, rice, corn, and combinations thereof;
  (b) a gum selected from the group consisting of pectin, gelatin, carrageenan, cellulose gum, microcrystalline cellulose, and combinations thereof;
  (c) a sugar;
  (d) a probiotic; and
  (e) any combination of (a)-(d);
thermally processing the emulsifier-containing blend by heating the blend;
cooling the emulsifier-containing blend;
admixing a gas with the heated, emulsifier-containing blend and aerating same to form an aerated product;
forming the aerated product into a plurality of drops having a weight in a range of from 0.8 to 1.2 grams; and
freeze drying the plurality of drops to form the shelf stable fruit and/or vegetable product, wherein the product is designed to be readily dissolvable upon consumption so as to increase child development by having a developmentally appropriate size, shape, and dissolution characteristics, and wherein the product is designed to reduce the risk of choking hazards for children with restricted or underdeveloped oral motor skills or digestive functions, whereby the product has a hardness value of from 0.5 to 8 pounds force peak load, a dissolvability in the range of from 0.1 to 8 pounds force peak load, a viscosity of from 1000 to 100,000 cp as measured at a 10 rpm speed of the spindle 6 in a Brookfield viscometer before the product is aerated, and a viscosity of from 30,000 to 60,000 cp when wet, and wherein the at least one fruit and/or vegetable ingredient is present in an amount from 60% to 80% by weight of the product prior to freeze-drying and the emulsifier is present in an amount of from 0.1% to 0.4% by weight of the product prior to freeze-drying.

* * * * *